United States Patent
Sinclair et al.

(10) Patent No.: US 7,136,861 B1
(45) Date of Patent: Nov. 14, 2006

(54) **METHOD AND SYSTEM FOR *MULTIPLE FUNCTION* DATABASE INDEXING**

(75) Inventors: Paul L. Sinclair, Manhattan Beach, CA (US); Steven B. Cohen, Redondo Beach, CA (US)

(73) Assignee: NCR Corp., Dayton, OH (US)

( * ) Notice: Subject to any disclaimer, the term of this patent is extended or adjusted under 35 U.S.C. 154(b) by 477 days.

(21) Appl. No.: 10/325,802

(22) Filed: Dec. 19, 2002

(51) Int. Cl.
G06F 17/30 (2006.01)
G06F 7/00 (2006.01)

(52) U.S. Cl. .................. 707/101; 707/100; 715/513
(58) Field of Classification Search ............ 707/2, 707/3, 100, 101
See application file for complete search history.

(56) References Cited

U.S. PATENT DOCUMENTS

| | | | |
|---|---|---|---|
| 5,802,357 A * | 9/1998 | Li et al. | 707/2 |
| 5,983,215 A * | 11/1999 | Ross et al. | 707/2 |
| 6,421,662 B1 * | 7/2002 | Karten | 707/3 |
| 6,618,729 B1 * | 9/2003 | Bhashyam et al. | 707/101 |
| 6,772,163 B1 * | 8/2004 | Sinclair et al. | 707/100 |

OTHER PUBLICATIONS

Leslie Cranston, New Data Clustering Techniques for Performance: Multidimensional Clustering, DB2 for Linux, Unix, Windows, Session: B6, Tuesday, May 14, 2002, 1 pm, IBM Toronto Lab.

* cited by examiner

*Primary Examiner*—Jeffrey Gaffin
*Assistant Examiner*—Hassan Mahmoudi
(74) *Attorney, Agent, or Firm*—Baker Botts, LLP (57) ABSTRACT

A method, computer program, and computer system are disclosed for indexing database table rows. A first set of one or more columns of the database table is chosen. A second set of one or more columns of the database table is chosen. An index record is generated for each unique result of applying a second function to a value corresponding to the second set for the database table rows. In each index record, only a single copy of each unique result of applying a first function to a value corresponding to the first set for the database table rows having the result of applying the second function to a value corresponding to the second set for that index record is included. The first set is not identical to the second set. At least two rows of the database table rows have the same result of applying the second function to a value corresponding to the second set and have the same result of applying the first function to the value corresponding to the first set.

31 Claims, 7 Drawing Sheets

METHOD AND SYSTEM FOR *MULTIPLE FUNCTION* DATABASE INDEXING

BACKGROUND

Database systems typically include tables, each of which includes rows, which are frequently divided into fields (or columns). Through queries, database users often request information stored in a table based on those rows having one or more particular values in a particular field. Data structures that assist in identifying or locating the rows that match the query requirements can decrease the time and system resources necessary to generate the correct query response.

SUMMARY

In general, in one aspect, the invention features a method for indexing database table rows. A first set of one or more columns of the database table is chosen. A second set of one or more columns of the database table is chosen. An index record is generated for each unique result of applying a second function to a value corresponding to the second set for the database table rows. In each index record, only a single copy of each unique result of applying a first function to a value corresponding to the first set for the database table rows having the result of applying the second function to a value corresponding to the second set for that index record is included. The first set is not identical to the second set. At least two rows of the database table rows have the same result of applying the second function to a value corresponding to the second set and have the same result of applying the first function to the value corresponding to the first set.

In general, in another aspect, the invention features a method for indexing database table rows. A first set of one or more columns of the database table is chosen. A second set of one or more columns of the database table is chosen. A third set of one or more columns of the database table is chosen. The database table rows are partitioned based on a partition value for each row that is a result of applying a third function to a value corresponding to the third set. An index record is generated for each unique result of applying a second function to a value corresponding to the second set for the database table rows. In each index record, only a single copy of each unique composite of a partition value and a result of applying a first function to a value corresponding to the first set for the database table rows having the result of applying the second function to a value corresponding to the second set for that index record is included. At least two rows of the database table rows have the same result of applying the second function to a value corresponding to the second set and have the same composite of a partition value and a result of applying the first function to the value corresponding to the first set.

In general, in another aspect, the invention includes a database system for indexing a set of database table rows. The system includes one or more nodes and a plurality of CPUs. Each of the one or more nodes provides access to one or more CPUs. The system includes a plurality of virtual processes. Each of the one or more CPUs provides access to one or more virtual processes. Each virtual process is configured to manage data, including database table rows, stored in one of a plurality of data-storage facilities. A secondary index for the database table rows includes an index record for each unique result of applying a second function to a value corresponding to a second set of one or more columns of the database table for the database table rows. Each index record has only a single copy of each unique result of applying a first function to a value corresponding to a first set of one or more columns of the database table for the database table rows having the result of applying the second function to a value corresponding to the second set for that index record. At least two rows of the database table rows have the same result of applying the second function to a value corresponding to the second set and have the same result of applying the first function to the value corresponding to the first set.

In general, in another aspect, the invention features a computer program stored in a tangible medium indexing a set of database table rows. The computer program includes instructions that are executable by a computer. The instructions cause the computer to allow the choice of a first set of one or more columns of the database table and a second set of one or more columns of the database table. An index record is generated for each unique result of applying a second function to a value corresponding to the second set for the database table rows. In each index record, only a single copy of each unique result of applying a first function to a value corresponding to the first set for the database table rows having the result of applying the second function to a value corresponding to the second set for that index record is included. The first set is not identical to the second set. At least two rows of the database table rows have the same result of applying the second function to a value corresponding to the second set and have the same result of applying the first function to the value corresponding to the first set.

DETAILED DESCRIPTION

Figure 1:
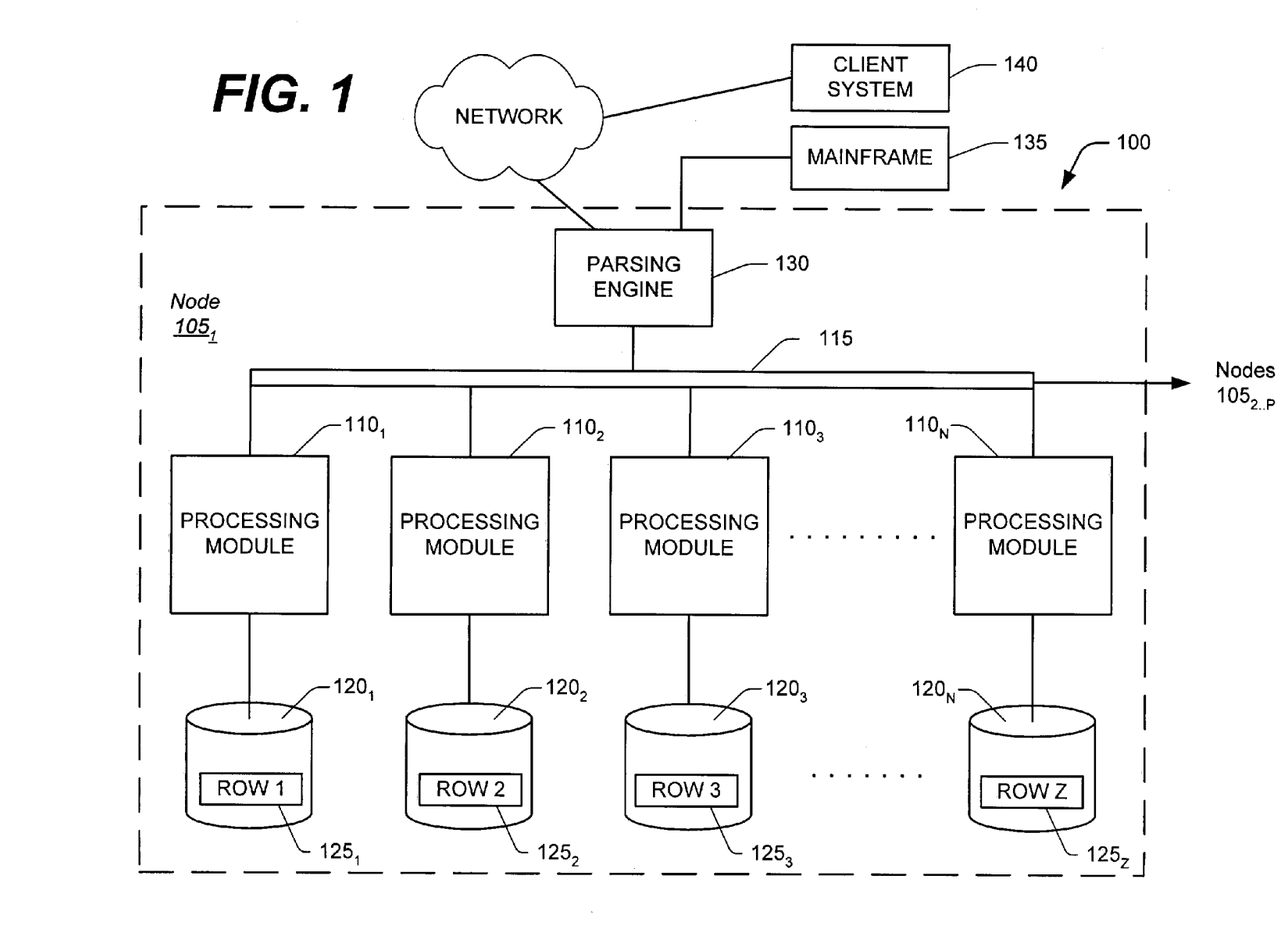
FIG. 1 is a block diagram of a node of a parallel processing database system.

The database table row indexing technique disclosed herein has particular application, but is not limited, to large databases that might contain many millions or billions of records managed by a database system ("DBS") 100, such as a Teradata Active Data Warehousing System available from NCR Corporation. FIG. 1 shows a sample architecture for one node $105_1$ of the DBS 100. The DBS node $105_1$ includes one or more processing modules $110_{1 \ldots N}$, connected by a network 115, that manage the storage and retrieval of data in data-storage facilities $120_{1 \ldots N}$. Each of the processing modules $110_{1 \ldots N}$ may be one or more physical processors or each may be a virtual processor, with one or more virtual processors running on one or more physical processors.

For the case in which one or more virtual processors are running on a single physical processor, the single physical processor swaps between the set of N virtual processors.

For the case in which N virtual processors are running on an M-processor node, the node's operating system schedules the N virtual processors to run on its set of M physical processors. If there are 4 virtual processors and 4 physical processors, then typically each virtual processor would run on its own physical processor. If there are 8 virtual processors and 4 physical processors, the operating system would schedule the 8 virtual processors against the 4 physical processors, in which case swapping of the virtual processors would occur.

Each of the processing modules $110_{1 \ldots N}$ manages a portion of a database that is stored in a corresponding one of the data-storage facilities $120_{1 \ldots N}$. Each of the data-storage facilities $120_{1 \ldots N}$ includes one or more disk drives. The DBS may include multiple nodes $105_{2 \ldots N}$ in addition to the illustrated node $105_1$, connected by extending the network 115.

The system stores data in one or more tables in the data-storage facilities $120_{1 \ldots N}$. The rows $125_{1 \ldots Z}$ of the tables are stored across multiple data-storage facilities $120_{1 \ldots N}$ to ensure that the system workload is distributed evenly across the processing modules $110_{1 \ldots N}$. A parsing engine 130 organizes the storage of data and the distribution of table rows $125_{1 \ldots Z}$ among the processing modules $110_{1 \ldots N}$. The parsing engine 130 also coordinates the retrieval of data from the data-storage facilities $120_{1 \ldots N}$ in response to queries received from a user at a mainframe 135 or a client computer 140. The DBS 100 usually receives queries and commands to build tables in a standard format, such as SQL.

In one implementation, the rows $125_{1 \ldots Z}$ are distributed across the data-storage facilities $120_{1 \ldots N}$ by the parsing engine 130 in accordance with their primary index. The primary index defines the columns of the rows that are used for calculating a hash value. See discussion of FIG. 3 below for an example of a primary index. The function that produces the hash value from the values in the columns specified by the primary index is called the hash function. Some portion, possibly the entirety, of the hash value is designated a "hash bucket". The hash buckets are assigned to data-storage facilities $120_{1 \ldots N}$ and associated processing modules $110_{1 \ldots N}$ by a hash bucket map. The characteristics of the columns chosen for the primary index determine how evenly the rows are distributed.

Figure 2:
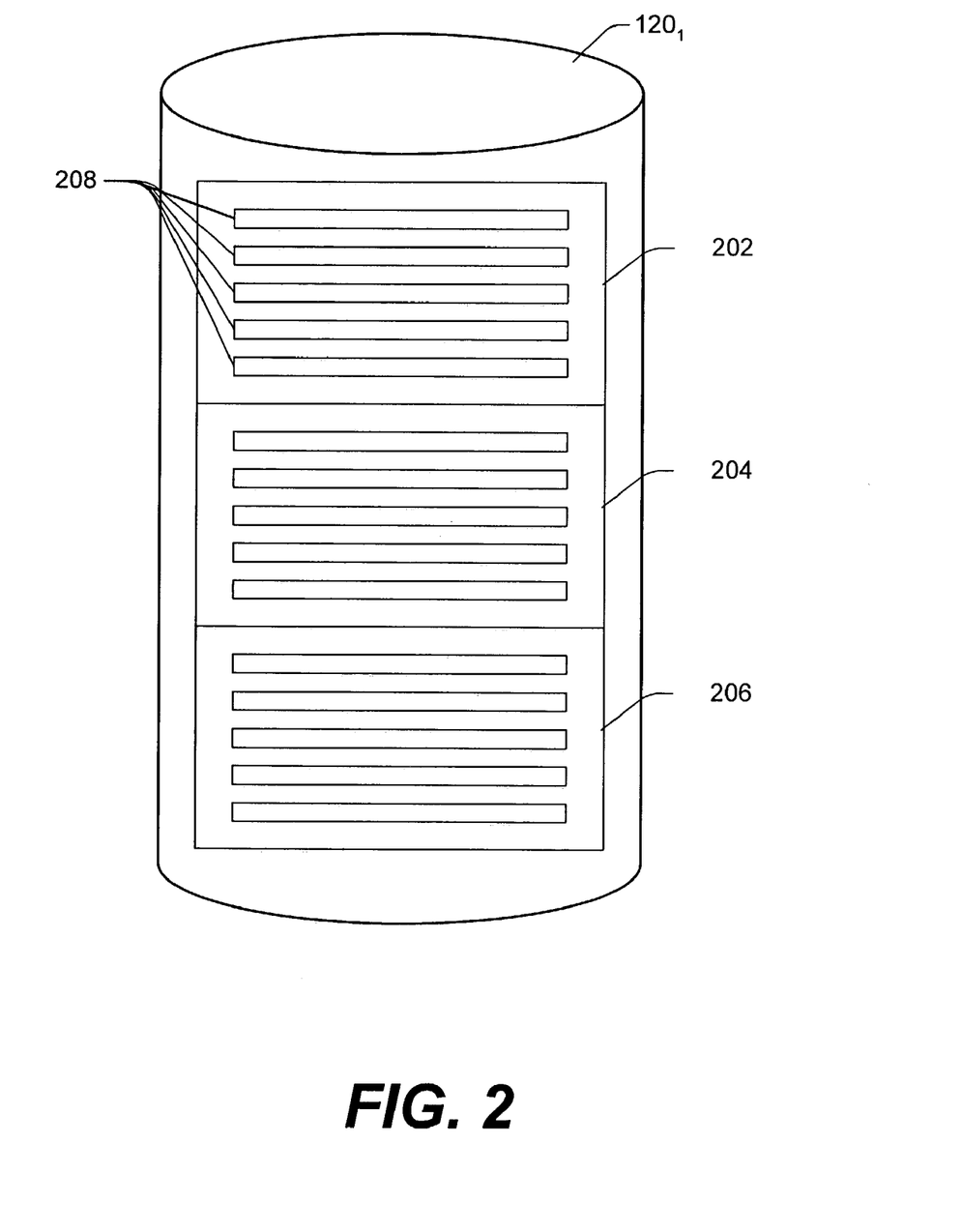
FIG. 2 illustrates an example partitioned database storage facility.

In one implementation of a large database system, the rows are further organized inside each data-storage facility. FIG. 2 illustrates an example partitioned database storage facility $120_1$. A first partition 202, second partition 204, and third partition 206 each contain rows 208. The rows 208 can also be organized within the partition. For example, rows 208 in a partition can be organized in an order corresponding to the hash values for each row. A database user can determine how the database system organizes rows into partitions. In one implementation, partitions are determined based on the value that results from applying a function to one or more values of a row. For example, if the table has a date column, then the rows could be partitioned by the month of that date. The first partition 202 could contain rows 208 with a January date, the second partition 204 could contain rows 208 with a February date, etc. In another implementation of a large database system, the rows are not partitioned within the data-storage facilities. The nonpartitioned rows can, but don't need to be, ordered in accordance with their hash values. Implementations of the disclosed index can be used with both partitioned and nonpartitioned tables.

Figure 3:
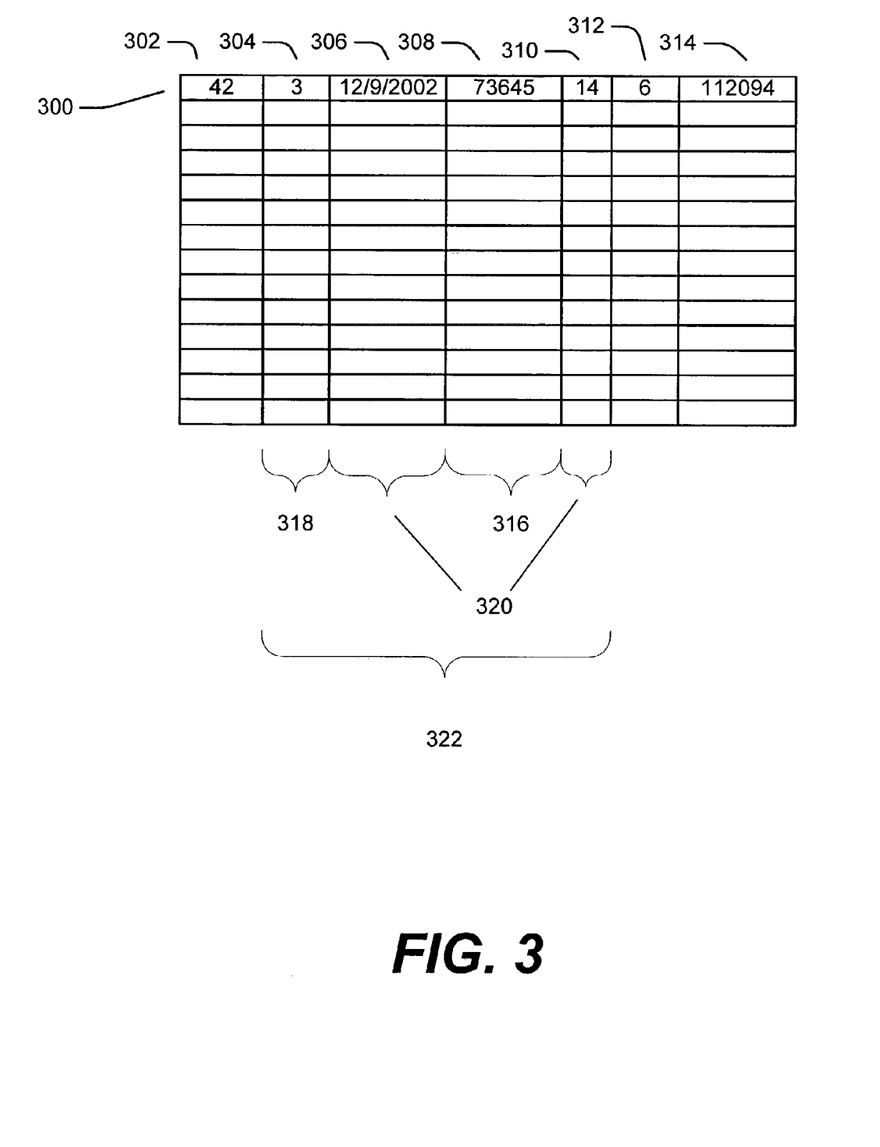
FIG. 3 illustrates a set of database table rows.

FIG. 3 illustrates a set of database table rows. The first row 300 is depicted as including values for each of the columns that correspond to an example sale table with a row for each sale made by the database user. In this particular implementation, the first column 302 contains a store number indicating where the sale occurred. The second column 304 contains a department number indicating which department of the store made the sale. The third column 306 contains a date indicating when the sale occurred. The fourth column 308 contains a product number indicating what product was the subject of the sale. The fifth column 310 contains a military hour showing when during the day the sale occurred. The sixth column 312 contains the register number indicating which sales register in the department handled the sale. The last column 314 contains an employee number indicating which employee made the sale. The sale table may be related to other tables in a star schema design. For example, a store table may include rows for each store that include additional details such as the address, lease details, and size along with the store number. Another possible table would be an employee table with rows linking the employee number to name, title, seniority, and other details. The use of store and employee numbers in the central sales table can conserve space because those numbers do not take much memory, while additional details can located in the related tables.

Tables such as the example sales table can be described as fact tables with the values in some of the columns acting as dimensions that define the fact evidenced in a particular row. If a user desires to determine all the sales of a particular product number, it would be useful to have an index based on that dimension 316. If a user desires to determine all the sales in a particular department, it would be useful to have an index based on that dimension 318. An index could also be generated on the composite of two or more columns. For example, an index could be generated on the date and time 320. The primary index, to which the hash function is applied to determine the hash of a row, can be chosen as the composite of the indexed dimension columns 322. In that implementation, each secondary index on a single dimension 316, 318 and the secondary index on a composite of two dimensions 320 operate on subsets of the columns in the primary index. The primary index provides multi-dimensional clustering around composite values of the indexed dimensions. The secondary indexes provide access to the data via the indexed dimensions. If values for a subset of the indexed dimensions are specified in a query, bit maps can be generated from the secondary indexes for the specified dimension values and combined to determine the data to be accessed. A bit map uses a 0 or 1 to indicate whether the table (or the portion of the table in a particular data-storage facility) includes one or more rows corresponding to a particular requirement. Where multiple requirements are specified, such maps can be ANDed or ORed together to create bit maps that reflect the result of the query.

Figure 4A:
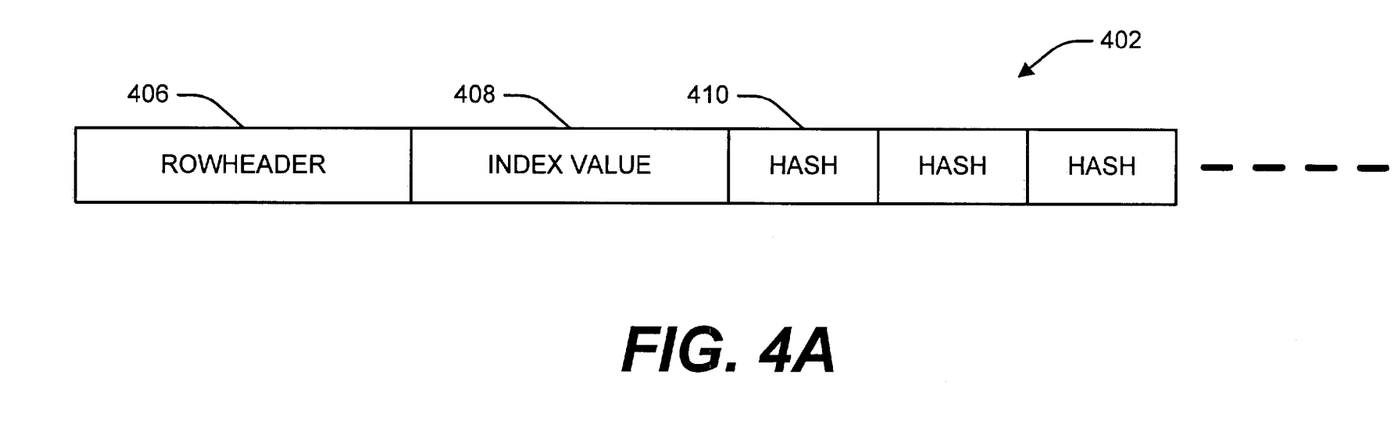
FIG. 4A is a data structure of an index record.

FIG. 4A is a data structure of an index record 402. In one implementation, a separate index is created for the rows in each data-storage facility. In that implementation, an index record will also be stored in the facility for each value of the indexed column or columns for the rows in that facility. For example, if an index is generated for the department number column and at least one row on a first data-storage facility has a department number of one, then an index record will be created corresponding to department number one. Another data-storage facility would not have an index record corresponding to that department if there were no rows stored there that included that department. In another implementation, an index is created for all the rows of the table. The index records could then be distributed across data-storage facilities based on the hash function result for the index value corresponding to each record.

In one implementation when the rows of the table are not partitioned, the index record 402 can be used. The row-header 406 can be specified by applying the hash function to the index value 408 and using the result along with a uniqueness value. For example, if two index values 408 are hash synonyms, i.e., have the same hash function result, then sequential numbers could be added to differentiate the row headers 406 for those index records 402. The index value 408 is the value of the column(s) designated for the index to which the index record 402 corresponds. Depending on the data in the table, the column(s) indexed, and the type of queries expected, some implementations do not include the index value 408 in the index record 402. In one implementation where the index value 408 is not included in the index record 402, the index records are generated based on unique hashes of index values rather than unique index values. More generally in another implementation, index records can be generated based on the unique results of a function applied to the index values. If the index value 408 is included, the index records can be ordered in the data-storage facility in accordance with those values. In another implementation, the index records are not ordered in accordance with the index values even if they are included in the index record 402. The index record 402 includes one or more hashes 410. Each hash 410 in the record 402 is included to indicate that at least one database table row with a primary index that results in that hash has the index value 408 in the indexed column. In one implementation, the hash is included only once no matter how many rows with that hash have the index value. As a result, the number of hashes included in an index record 402 does not indicate the number of rows having the corresponding index value. For example, an index record 402 with a single hash may correspond to an index value in more rows than an index record 402 including many hashes. The table rows themselves must be scanned to determine how many contain the index value. For hash-distributed database systems, scanning the rows based on the index record is fairly efficient because each hash only requires the scan of one data-storage facility. In one implementation, the hashes are stored in the index record in order.

Figure 4B:
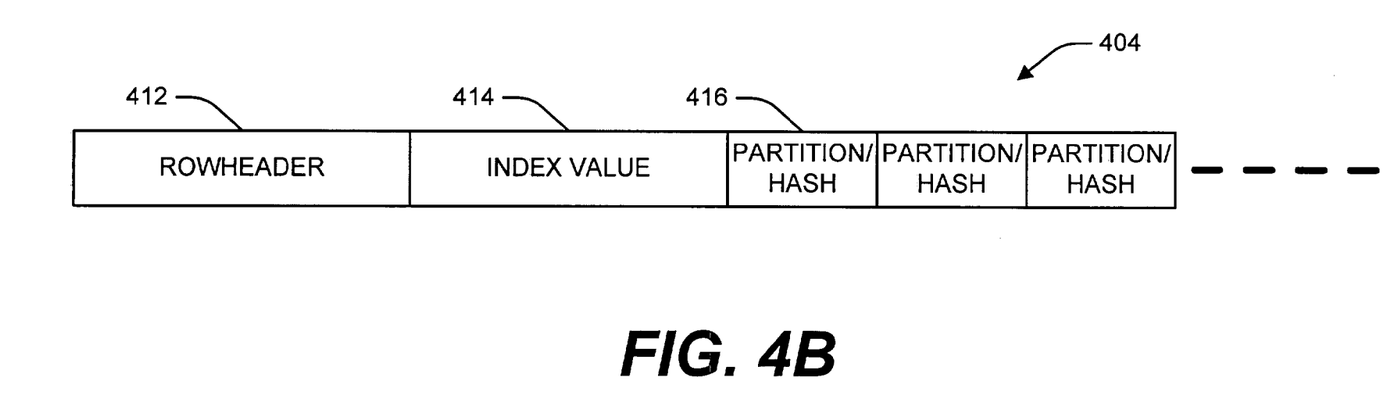
FIG. 4B is a data structure of an index record.

FIG. 4B is a data structure of an index record 404. In one implementation when the rows of the table are partitioned, a secondary index can be generated on one or more columns of that table using index record 404. Like the index record for nonpartitioned tables 402, the index record 404 can include a row header 412 and the corresponding index value 414. In one implementation where the index value 414 is not included in the index record 404, the index records are generated based on unique hashes of index values rather than unique index values. More generally in another implementation, index records can be generated based on the unique results of a function applied to the index values. Instead of hashes, the record includes composites of partition value and hash 416. The index record 402 takes up less memory and could be used with a partitioned database table, but under some circumstances could less accurately specify the location of the relevant rows in the data-storage facility in comparison to an index record that included a full row identification.

Using one of the index record formats shown, a query for database rows having a certain value in the column(s) indexed can be executed by pulling hashes 410 or part/hashes 416 from the corresponding index record, if any, on each data-storage facility. From the qualifying index entries, each hash (or part/hash) is used to locate the rows with that hash (or part/hash) in the table. Each hash (or part/hash) is then scanned in the table for qualifying rows. Note that the conditions used to access the index must be reapplied to the rows in the table due to the potential for hash synonyms (that is, multiple values resulting in the same hash or (part/hash)). In one implementation, the part/hashes are stored in the index record in order.

If there are multiple indexes for which the query has conditions on the value of that index, bit mapping can be used. The bit map is based on hash (or part/hash) values but does not specify particular rows. In some implementations, conditions on the values of indexes with row specific entries in combination with conditions on the values of hash-specific or hash/partition-specific entries allows bit mapping to be adjusted based on the logic.

For ANDed conditions, combining a bit map based on hash (or part/hash) values with a bit map based on row-specific values results in a bit map that specifically identifies rows. The hash (or part/hash) portion of the row-specific value is checked in the bit map and, if the corresponding bit is set, the corresponding bit of that row-specific value can be set in the resulting bit map. For ORed conditions, combining a bit map based on hash (or part/hash) values with a bit map that specifically identifies rows can result in a bit map based on hash (or part/hash) values. The resulting bit map is the same as the bit map based on hash (or part/hash) values with additional bits set based on the hash (or part/hash) portion of the qualifying row-specific values. In another implementation, the row-specific information that results from the logical OR of a unqualified hash and a qualified row-specific value can be retained. The bit map can then be used to locate rows to be scanned and compared with the actual conditions.

Figure 5:
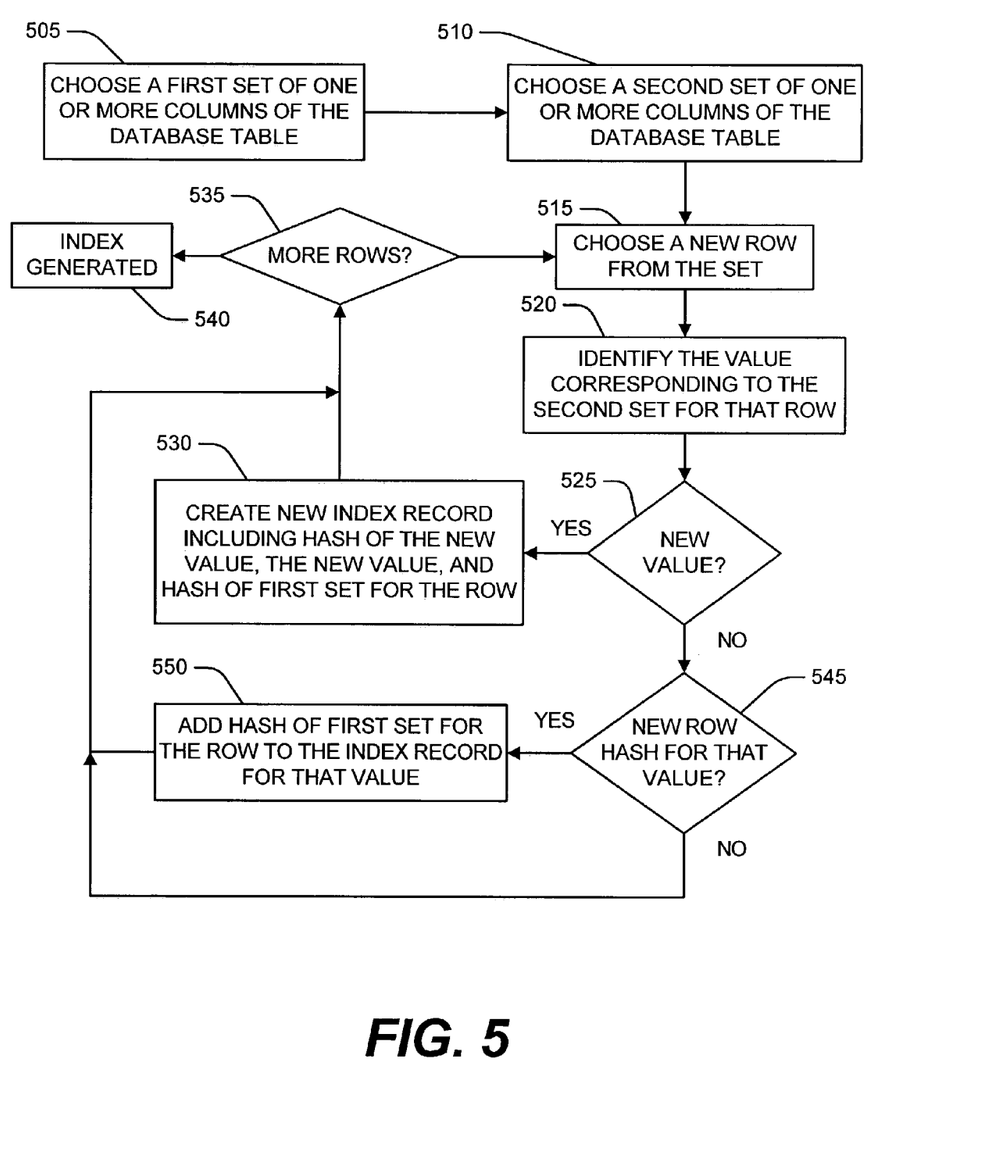
FIG. 5 is a flow diagram of one implementation of a method for indexing database table rows.

FIG. 5 is a flow diagram of one implementation of a method for indexing database table rows. A first set of one or more columns of the database table is chosen 505. In one implementation the first set is the primary index by which hashes are determined for distributing the rows among the data-storage facilities. Then a second set of one or more columns of the database table is chosen 510. One of the database table rows is chosen 515. The value from the one or more fields corresponding to the second set is identified 520. For example, if the index is on the department number, the department number for the row is identified. If that value has not yet been encountered 525, then a new index record can be generated with the hash of that value, the value itself, and the hash of the first set for that row (which is the row hash in the implementation where the first set is the primary index) 530. In another implementation, the comparison of 525 is replaced with a comparison between hashes or the result of another function applied to the second set value. In other words, if the hash of that value has not yet been encountered, then a new index record can be generated with the hash of that value and the hash of the first set for that row. In that implementation, the value of the second set would not be included in the index record. If there are more rows 535, another one is chosen 515. If there aren't more rows 535, then the index has been generated 540. When a chosen row has an index value that is not new 525 (or a hash of the index value as discussed above), the hash of that row (determined from the first set) is compared with the index record for its index value 545 (or hash of its index value). If the row hash is not yet in the index record, it is added 550, otherwise the index record remains unchanged. In either case the process loops.

Figure 6:
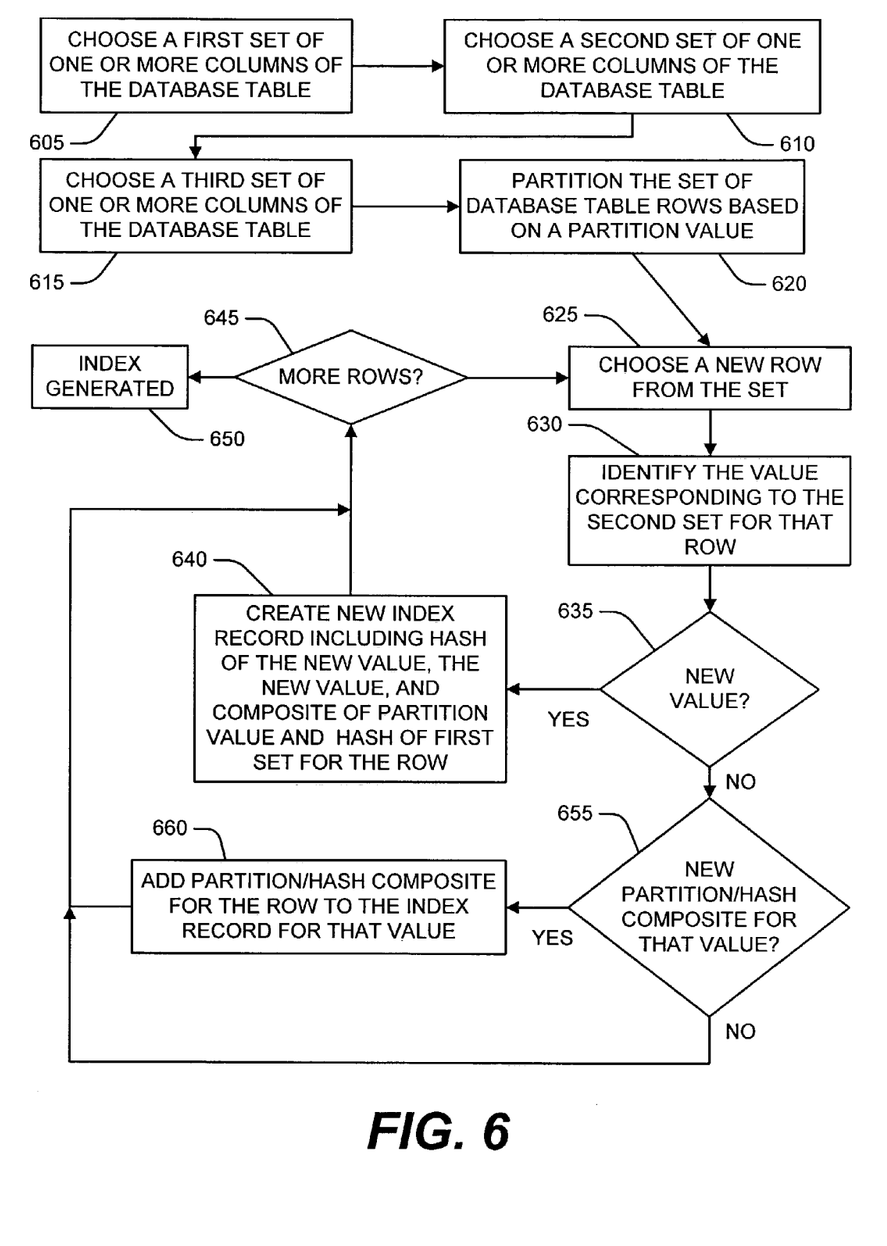
FIG. 6 is a flow diagram of one implementation of a method for indexing database table rows.

FIG. 6 is a flow diagram of one implementation of a method for indexing database table rows when the rows are part of a partitioned table. A first set of one or more columns of the database table is chosen 605. In one implementation the first set is the primary index by which hashes are determined for distributing the rows among the data-storage facilities. Then a second set of one or more columns of the database table is chosen 610. Then a third set of one or more columns of the database table is chosen 615. In one implementation the third set is the partitioning column(s) by which partition values are determined for ordering the rows within the data-storage facilities 620. One of the database table rows is chosen 625. The value from the one or more fields corresponding to the second set is identified 630. If that value has not yet been encountered 635, then a new index record can be generated with the hash of that value, the value itself, and a composite of the partition value and the hash of the first set for that row (which is the row hash in the implementation where the first set is the primary index) 640. In another implementation, the comparison of 535 is replaced with a comparison between hashes or the result of another function applied to the second set value. In other words, if the hash of that value has not yet been encountered, then a new index record can be generated with the hash of that value and a composite of the partition value and the hash of the first set for that row. In that implementation, the value of the second set would not be included in the index record. If there are more rows 645, another one is chosen 625. If there aren't more rows 645, then the index has been generated 650. When a chosen row has an index value that is not new 635 (or a hash of an index value that is not new), the partition value/hash of that row (determined from applying functions to the third and first sets) is compared with the index record for its index value 655 (or hash of its index value). If the composite is not yet in the index record, it is added 660, otherwise the index record remains unchanged. In either case the process loops.

Figure 7:
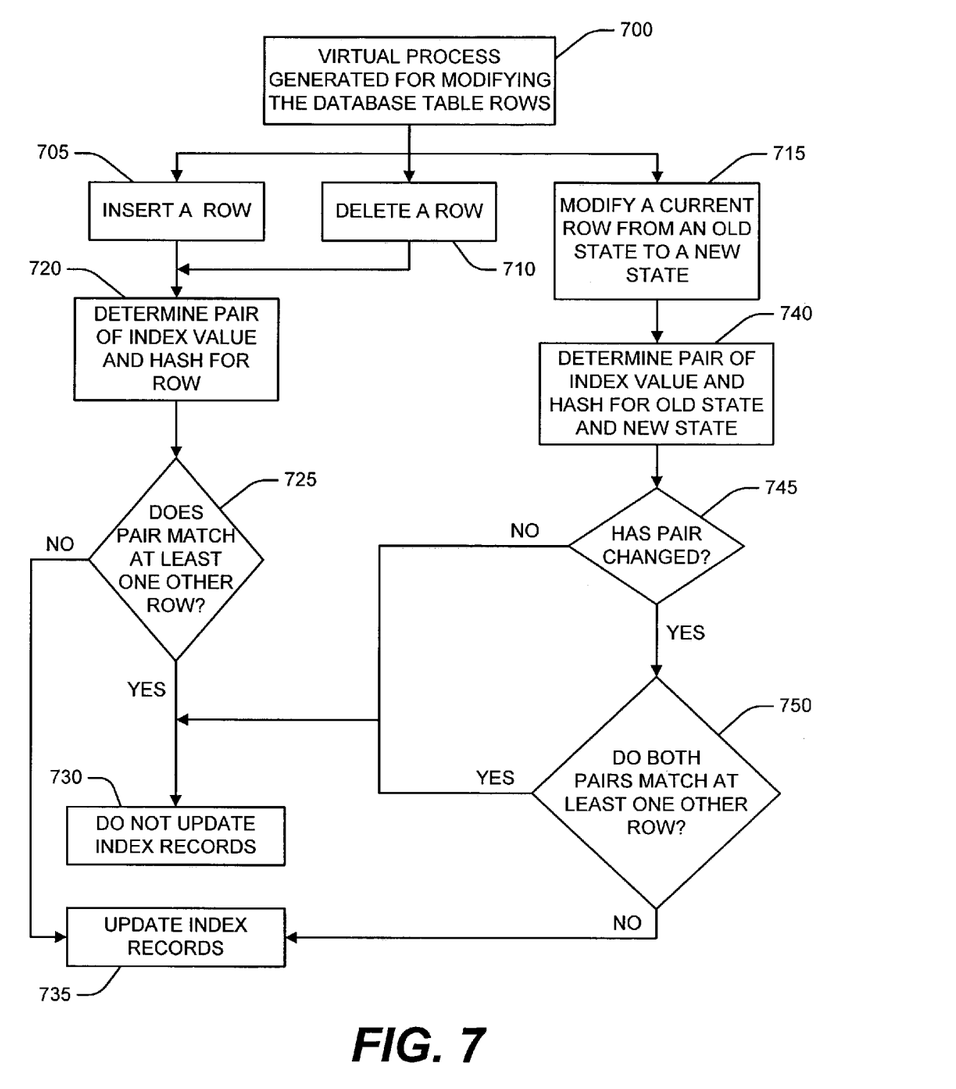
FIG. 7 is a flow diagram of one implementation of a method for modifying indexed database table rows.

FIG. 7 is a flow diagram of one implementation of a method for modifying indexed database table rows. When a virtual process is generated for modifying the indexed database table rows 700 it can be for insertion 705, deletion 710, or modification 715. When a row is to be inserted or deleted 720, the pair of index value and hash (partition/hash composite if necessary) are identified 720 and compared to the other indexed database table rows 725. In another implementation, the pair of the hash of the index value and the hash of the first set (partition/hash composite if necessary) are identified and compared. If there is a match, there is no need to update an index record 730. For inserts, this is because there is already the necessary entry. For deletes, this is because the entry is still necessary. If there is not a match, an index record must be updated 735. For an insert, either a new record must be created with the hash (if no other rows have the index value) or the hash must be added to the current index record for the value (or hash of value). For a delete, either a record must be removed (if no other rows have the index value or no other rows have the hash of the index value depending on the implementation) or the hash must be removed from the current index record for the value (or hash of the index value). A modify only potentially causes a change if one of the index value (or hash of the index value) and hash value (partition/hash composite if necessary) 740 are going to change 745. If they are going to change, the situation is treated as a delete of the old state and an insert of the new state. Only if both states match other rows 750, will no change be necessary 730. If either fails to match then a change will occur 735.

In another implementation of modifying the database table rows, the two parts of the pair can be sequentially matched instead of matched together as described in FIG. 7. This can improve efficiency when the second part does not need to be compared because there was no match of the first part. When inserting a row into a table with hash or part/hash based indexes, two cases can occur: (1) There are no rows in the corresponding hash (or part/hash). In this case, maintenance is required for each of the indexes on the table. Each index is checked for an record corresponding to the index value in the inserted row. The index record is found either by hash or value lookup depending on the index followed by matching the index values, if any, in the index. If a non-full index record exists, the hash (or part/hash) of the inserted row is added to the record. If a record does not exist (or the existing records are all full), a new record is added along with a reference to the hash (or part/hash) of the new row. (2) There are rows in the corresponding hash (or part/hash). In this case, the hash (or part/hash) must be scanned to see if there is a row with the same values for the values of an index in the inserted row. Note that the hash values are compared instead of comparing the actual values if there is not a separate field for the index value in the index entry. If there is not a row with duplicate values (or hashes) for the index, each such index must be maintained as described in the preceding case. Otherwise, maintenance does not need to be applied to the corresponding index. Note that not all rows of the hash (or part/hash) necessarily need to be scanned. The scan can stop as soon as at least one row has been found with the value (or hash) for each of the values (or hashes) of index of the inserted row. A bit map could be used to keep track of which values have been found and which have not.

When deleting a row from a table with compact indexes, two cases can occur: (1) This is the last row in the corresponding hash (or part/hash). In this case, maintenance is required for each of the indexes on the table. The corresponding index records for the index value in the deleted row are searched for the hash (or part/hash) of the primary index of the deleted row. The index record is found either by hash or value lookup depending on the index followed by matching the index values, if any, in the index. The hash (or part/hash) of the deleted row is deleted from the record in which it is found; this entire record is also deleted if there are no other hash (or part/hash) values in the record. (2) This is not the last row in the corresponding hash (or part/hash). In this case, the hash (or part/hash) must be scanned to see if there is another row with the same values for the values of the index in the deleted row. Note that the hash values are compared instead of comparing the actual values if there is not a separate field for the index value in the index record. If there is not another row with duplicate values (or hashes) for the index record, each such index must be maintained as described in the preceding case. Otherwise, maintenance does not need to be applied to the corresponding index. Note that not all rows of the hash (or part/hash) necessarily need to be scanned. The scan can stop as soon as at least one other row has been found with the value (or hash) for each of the values (or hashes) of index of the deleted row. A bit map could be used to keep track of which values have been found and which have not.

When updating a row in a table with compact indexes, three cases can occur: (1) The primary index columns, partitioning columns (if any), and index columns, of the row are not updated. In this case, maintenance is not required for the compact secondary indexes. (2) The primary index columns and partitioning columns (if any) are updated. In this case, the update is treated as a delete of the old row and insert of the updated row with the index maintenance described above for deletes and inserts. Note that this case could be optimized to minimize index maintenance if the hash (or part/hash) of the updated primary index and partitioning columns does not actually change. The rarity of this circumstance would have an impact on the advantage to be gained, if any, by implementing the functionality. (3) The primary index columns and partitioning columns (if any) are not updated but indexes are updated. In this case, the update is treated as a delete of the old row and insert of the updated row with the index maintenance described above except that only the updated indexes need to be checked.

In some implementations, the following data-dependent conditions can correlate with improved performance using the disclosed indexing technique without partitions, compared to conventional indexing techniques. (1) There are few, if any, occurrences of rows with the same hash of their respective primary index values but with different primary index values. (2) The columns of the secondary index are included in the primary index. In other words, the second set of columns is a subset of the first set of columns. The following data-dependent conditions can correlate with improved performance using the disclosed indexing technique with partitions, compared to conventional indexing techniques. (1) There are few, if any, occurrences of rows with the same partition and hash of their respective partitioning column values and primary index values but with different partitioning column values and primary index values. (2) The columns of the secondary index are included in the primary index.

In some implementations, a version of the disclosed indexing technique is one option among several indexing techniques available for the user of database system software. Such systems are included within the scope of the disclosure. Systems may also employ optimizers that determine based on data characteristics and other factors whether to employ the index records in executing a particular query. The option of employing the index records can contribute to an improvement in the overall performance of the system.

The foregoing description of the preferred embodiment of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto.

What is claimed is:

1. A method for indexing database table rows, comprising the steps of:
   a. choosing a first set of one or more columns of the database table;
   b. choosing a second set of one or more columns of the database table;
   c. generating with a computer an index record for each unique value of the second set for the database table rows;
   d. in each index record, including only a single copy of each unique result of applying a first function to a value corresponding to the first set for the database table rows having the value corresponding to the second set for that index record;
   wherein at least two rows of the database table rows have the same value corresponding to the second set and have the same result of applying the first function to the value corresponding to the first set.

2. A method for indexing database table rows, comprising the steps of:
   a. choosing a first set of one or more columns of the database table;
   b. choosing a second set of one or more columns of the database table;
   c. applying with a computer a second function to a value corresponding to the second set for each row of the database table rows;
   d. generating with a computer an index record for each unique result of step c;
   e. in each index record, including only a single copy of each unique result of applying a first function to a value corresponding to the first set for the database table rows having the result of applying the second function to the value corresponding to the second set for that index record;
   wherein at least two rows of the database table rows have the same result of applying the second function to the value corresponding to the second set and have the same result of applying the first function to the value corresponding to the first set.

3. The method of claim 1, wherein the database table rows include all the rows for a particular table stored in a particular storage facility.

4. The method of claim 1, wherein the database table rows include all the rows for a particular table.

5. The method of claim 1, wherein the second set is a subset of the first set.

6. The method of claim 1, further comprising the step of:
   f. in each index record, including the value corresponding to the second set for that index record.

7. The method of claim 1, further comprising the step of:
   f. in each index record, including a result of applying the first function to the value corresponding to the second set for that index record.

8. The method of claim 1, further comprising the steps of:
   f. choosing a row having a value corresponding to the second set that is identical to that value for a matching row in the database table rows and having a result of applying the first function to a value corresponding to the first set that is identical to that result for the matching row; and
   g. inserting the chosen row into or deleting the chosen row from the database table rows without modifying the index records.

9. The method of claim 1, further comprising the step of:
   f. if a chosen row of the database table rows is to be modified from a first state to a second state,
   wherein the first state of the row has a value corresponding to the second set that is identical to that value for a first matching row in the database table rows and having a result of applying the first function to a value corresponding to the first set that is identical to that result for the first matching row; and
   wherein the second state of the row has a value corresponding to the second set that is identical to that value for a second matching row in the database table rows and having a result of applying the first function to a value corresponding to the first set that is identical to that result for the second matching row;
   then modifying the chosen row without modifying the index records.

10. The method of claim 1, wherein the first function is equality.

11. A method for indexing database table rows, comprising the steps of:
    a. choosing a first set of one or more columns of the database table;
    b. choosing a second set of one or more columns of the database table;

c. choosing a third set of one or more columns of the database table;

d. partitioning the database table rows based on a partition value for each row that is a result of applying a third function to a value corresponding to the third set;

e. generating with a computer an index record for each unique result of applying a second function to a value corresponding to the second set for the database table rows;

f. in each index record, including only a single copy of each unique composite of a partition value and a result of applying a first function to a value corresponding to the first set for the database table rows having the result of applying the second function to a value corresponding to the second set for that index record; and wherein at least two rows of the database table rows have the same result of applying the second function to a value corresponding to the second set and have the same composite of a partition value and a result of applying a first function to a value corresponding to the first set.

12. A computer program, stored in a tangible medium, for indexing database table rows, the program comprising executable instructions that cause a computer to:

a. allow the choice of a first set of one or more columns of the database table;

b. allow the choice of a second set of one or more columns of the database table;

c. generate an index record for each unique value of the second set for the database table rows;

d. in each index record, include only a single copy of each unique result of applying a first function to a value corresponding to the first set for the database table rows having the value corresponding to the second set for that index record;

wherein at least two rows of the database table rows have the same value corresponding to the second set and have the same result of applying the first function to the value corresponding to the first set.

13. A computer program, stored in a tangible medium, for indexing database table rows, the program comprising executable instructions that cause a computer to:

a. allow the choice of a first set of one or more columns of the database table;

b. allow the choice of a second set of one or more columns of the database table;

c. apply a second function to a value corresponding to the second set for each row of the database table rows;

d. generate an index record for each unique result of c;

e. in each index record, include only a single copy of each unique result of applying a first function to a value corresponding to the first set for the database table rows having the result of applying the second function to a value corresponding to the second set for that index record;

wherein at least two rows of the database table rows have the same result of applying the second function to a value corresponding to the second set and have the same result of applying the first function to the value corresponding to the first set.

14. The computer program of claim 13, wherein the database table rows include all the rows for a particular table stored in a particular storage facility.

15. The computer program of claim 13, wherein the database table rows include all the rows for a particular table.

16. The computer program of claim 13, wherein the second set is a subset of the first set.

17. The computer program of claim 13, further comprising instructions that cause a computer to:

f. in each index record, include the value corresponding to the second set for that index record.

18. The computer program of claim 13, further comprising instructions that cause a computer to:

f. in each index record, include a result of applying the first function to the value corresponding to the second set for that index record.

19. The computer program of claim 13, wherein the first function is equality.

20. The computer program of claim 13, further comprising instructions that cause a computer to:

f. allow the choice of a row having a value corresponding to the second set that is identical to that value for a matching row in the database table rows and having a result of applying the first function to a value corresponding to the first set that is identical to that result for the matching row; and g. insert the chosen row into or delete the chosen row from the database table rows without modifying the index records.

21. The computer program of claim 13, further comprising instructions that cause a computer to:

f. if a chosen row of the database table rows is to be modified from a first state to a second state, wherein the first state of the row has a value corresponding to the second set that is identical to that value for a first matching row in the database table rows and having a result of applying the first function to a value corresponding to the first set that is identical to that result for the first matching row; and wherein the second state of the row has a value corresponding to the second set that is identical to that value for a second matching row in the database table rows and having a result of applying the first function to a value corresponding to the first set that is identical to that result for the second matching row;

then modify the chosen row without modifying the index records.

22. A database system for indexing a first set of database table rows, the system comprising:

one or more nodes;

a plurality of CPUs, each of the one or more nodes providing access to one or more CPUs;

a plurality of virtual processes, each of the one or more CPUs providing access to one or more virtual processes;

each virtual process configured to manage data, including database table rows, stored in one of a plurality of data-storage facilities; and a secondary index of the database table rows includes:

an index record for each value corresponding to a second set of one or more columns of the database table for the database table rows;

each index record includes only a single copy of each unique result of applying a first function to a value corresponding to a first set of one or more columns of the database table for the database table rows having the value corresponding to a second set for that index record;

wherein at least two rows of the database table rows have the same value corresponding to a second set and have the same result of applying the first function to the value corresponding to the first set.

23. A database system for indexing a first set of database table rows, the system comprising:
- one or more nodes;
- a plurality of CPUs, each of the one or more nodes providing access to one or more CPUs;
- a plurality of virtual processes, each of the one or more CPUs providing access to one or more virtual processes;
- each virtual process configured to manage data, including database table rows, stored in one of a plurality of data-storage facilities; and
- a secondary index of the database table rows includes:
    - an index record for each unique result of applying a second function to a value corresponding to a second set of one or more columns of the database table for the database table rows;
    - each index record includes only a single copy of each unique result of applying a first function to a value corresponding to a first set of one or more columns of the database table for the database table rows having the result of applying the second function to a value corresponding to a second set for that index record;
    - wherein at least two rows of the database table rows have the same result of applying the second function to a value corresponding to a second set and have the same result of applying the first function to the value corresponding to the first set.

24. The system of claim 23, wherein the database table rows include all the rows for a particular table stored in a particular data-storage facility.

25. The system of claim 23, wherein the database table rows include all the rows for a particular table.

26. The system of claim 23, wherein the second set is a subset of the first set.

27. The system of claim 23, wherein the index records include the value corresponding to the second set for that index record.

28. The system of claim 23, wherein the index records include a result of applying the first function to the value corresponding to the second set for that index record.

29. The system of claim 23, wherein the first function is equality.

30. The system of claim 23, wherein a virtual process inserts a designated row into or deletes a designated row from the database table rows without modifying the index records where the designated row has a value corresponding to the second set that is identical to that value for a matching row in the database table rows and having a result of applying the first function to a value corresponding to the first set that is identical to that result for the matching row.

31. The system of claim 23, wherein a virtual process modifies a designated row of the database table rows from a first state to a second state without modifying the index records:
- where the first state of the row has a value corresponding to the second set that is identical to that value for a first matching row in the database table rows and having a result of applying the first function to a value corresponding to the first set that is identical to that result for the first matching row; and
- where the second state of the row has a value corresponding to the second set that is identical to that value for a second matching row in the database table rows and having a result of applying the first function to a value corresponding to the first set that is identical to that result for the second matching row.

* * * * *